(12) United States Patent
Thomas et al.

(10) Patent No.: US 6,362,781 B1
(45) Date of Patent: *Mar. 26, 2002

(54) METHOD AND DEVICE FOR ADAPTIVE ANTENNA COMBINING WEIGHTS

(75) Inventors: Timothy A. Thomas, Palatine; Frederick W. Vook, Schaumburg, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/607,736

(22) Filed: Jun. 30, 2000

(51) Int. Cl.$^7$ .................................................. G01S 3/28

(52) U.S. Cl. ...................................... 342/383; 342/367

(58) Field of Search ................................ 342/361, 367, 342/378, 383; 455/67.6, 205

(56) References Cited

U.S. PATENT DOCUMENTS

| | | | | |
|---|---|---|---|---|
| 5,559,757 A | * | 9/1996 | Catipovic et al. | 367/134 |
| 5,617,099 A | * | 4/1997 | Warren et al. | 342/159 |
| 5,796,779 A | * | 8/1998 | Nussbaum et al. | 375/267 |
| 5,982,327 A | * | 11/1999 | Vook et al. | 342/380 |
| 6,215,983 B1 | * | 4/2001 | Dogan et al. | 455/63 |

OTHER PUBLICATIONS

Article entitled "Adaptive Frequency–Domain Equalization and Diversity Combing For Broadband a Wireless Communications," (Author, Martin V. Clark, *IEEE JSAC*, vol. 16, pp. 1385–1395, Oct. 1998).

Article entitled "Basis Expansions Models and Diversity Techniques for Blind Identification and Equalization of Time–Varying Channels," (Author GeorgiosB. Giannakis, *Proc. IEEE*, vol. 86, No. 10, pp. 1969–1986, Oct. 1998).

Article entitled "Characterization of Fast Fading Vector Channels for Multi–Antenna Communication Systems," (Authors Gregory Raleigh, Suhas N. Diggavi, Ayman F. Naguib, Arogyaswami Paulraj, Proc. 28th Asilomar Conf., Pacific Grove Ca, 5 pp., Nov. 1994).

Article entitled "Deterministic Approaches for Blind Equalization of Time–Varying Channels with Antenna Arrays," (Authors Hui Liu, Georgios B. Giannakis, *IEEE Trans on Sig. Proc.*, vol. 46, No. 11, pp. 3003–3013, Nov. 1998

Article entitled "Least–Squares Multi–User Frequency–Domain Channel Estimation for Broadband Wireless Communication Systems," (Authors Timothy A. Thomas A. Thomas, Fred W. Vook and Kevin L. Baum, 37th Allerton Conference, Monticello, IL, 10 pp., Sep. 1999).

Article entitled "Linear and Nonlinear Programming," (Author David G. Luenberger, Addison–Wesley Publishing Company, Monlo Park, CA, pp. 215–216, 1989).

(List continued on next page.)

*Primary Examiner*—Dao Phan
(74) *Attorney, Agent, or Firm*—Douglas D. Fekete; Daniel W. Juffernbruch

(57) ABSTRACT

A receiving device and method for operating a communication system are provided. The receiving device receives a plurality of time-domain Doppler channel estimates for at least one transmitter, a plurality of Doppler sinusoids, and a spatial covariance matrix of a corrupting environment. A Doppler spatial covariance matrix is created as a function of the time-domain Doppler channel estimates and the Doppler sinusoids. A total Doppler spatial covariance matrix is created as a function of the spatial covariance matrix of the corrupting environment and the Doppler spatial covariance matrix. A Doppler steering vector is created for at least one transmitter as a function of the Doppler channel estimates and the Doppler sinusoids. A combining weight for the at least one transmitter is then created as a function of the total Doppler spatial covariance matrix and the Doppler steering vector for at least one transmitter.

33 Claims, 8 Drawing Sheets-

OTHER PUBLICATIONS

Article entitled "Multicarrier Modulation for Data Transmission: An Idea Whose Time Has Come," (Author John A. C. Bingham, *IEEE Comm. Mag.*, vol. 28, pp. 5–14, May 1990).

Article entitled "Robust Channel Estimation for OFDM Systems with Rapid Dispersive Fading Channels," (Authors Ye G. Li, Leonard J. Cimini, Jr., Nelson R. Sollenberger, *IEEE Trans. On Comm.*, vol. 46, pp. 902–915, Jul. 1998).

Article entitled "Sinusoidal Model and Prediction of Fast Fading Processes," (Authors Jeng–Kuang Hwang, Jack H. Winters, Globecom, pp. 892–897, 1998).

Article entitled "Space–Time Modems for Wireless Personal Communications," (Author A. J. Paulraj, Boon C. Ng, *IEEE Personal Communications Magazine*, pp. 36–48, Feb. 1998).

Article entitled "Analysis of DFT–Based Channel Estimators for OFDM*" (Authors Ove Edfors, Magnus Sandell, Jan–Jaap van de Beek, Sara Kate Wilson, Per Ola Börjesson, This work has been presented in part at the 1995 Vehicular Technology Conference (VTC '96) in Chicago, Illinois, Jul. 25–28, 1995, pp. 815–819).

Article entitled "Channel Estimation for OFDM Systems with Transmitter Diversity in Mobile Wireless Channels" (Authors Ye(Geoffrey) Li, Senior Member, IEEE, Nambirajan Seshadri, Senior Member, IEEE, and Sirikia Ariyavisitakul, Senior Member, IEEE, pp. 461–471, *IEEE Journal on Selected Areas in Communications*, vol. 17. No. 3, Mar. 1999).

* cited by examiner

METHOD AND DEVICE FOR ADAPTIVE ANTENNA COMBINING WEIGHTS

This application is related to Ser. No.: 09/607,736 and 09/608,760, both filed on Jun. 30, 2000.

FIELD OF THE INVENTION

The present invention generally relates to the field of communication systems and more particularly, to establishing the adaptive antenna combining weights for at least one desired signal received by at least one antenna for non-null cyclic prefix communication systems.

BACKGROUND OF THE INVENTION

In a wireless communication system, a major design challenge is to maximize system capacity and performance in the presence of interference, and a time-varying multipath channel. Multipath propagation is caused by the transmitted signal reflecting off objects near the transmitter and receiver and arriving at the receiver over multiple paths. Interference in a communication system can come from a variety of sources depending on the particular system deployment. If the system is in motion, then Doppler induced channel variations become an issue. Furthermore, rapid channel variations can cause Doppler-induced Inter-Carrier Interference (ICI) in the frequency-domain. Interference and multipath are major factors that limit the achievable performance and capacity of a communication system because both effects interfere with the ability of a communication receiver to properly decode the transmitted data.

In a multipath propagation channel, the transmitted signal propagates to the receiver over a finite number $L_p$ of propagation paths, where each path has an associated time delay and complex gain. In such a channel, the communication receiver receives the superposition of $L_p$ delayed, attenuated, and phase-shifted copies of the transmitted signal. The number of paths $L_p$ and their time delays and phase shifts depends on the physical location of the various scattering objects (such as buildings, automobiles, and trees) in the immediate vicinity of the transmitter and receiver. The complex attenuation (magnitude and phase) of each path depends on the length of each path, as well as the material composition of any scatterers or reflectors encountered along the path.

The presence of multipath can severely distort the received signal. In a multipath environment, the multiple copies of the transmitted signal can interfere constructively in some portions of the occupied bandwidth. In other portions of the occupied bandwidth, the multiple copies can interfere destructively at the receiver. The signal duplication causes unwanted variations in the received signal strength over the bandwidth occupied by the signal. Furthermore, if the difference in the path delays of the various propagation paths is significantly greater than the duration of a transmitted information symbol, then intersymbol interference is present at the receiver. When intersymbol interference is present, the received signal is corrupted by prior transmitted symbols propagating over paths having delays relative to the shortest path that are longer than the duration of an information symbol. The demodulation process (the process of determining which information symbol was transmitted) becomes difficult in the presence of intersymbol interference.

In a mobile wireless communication system, the complex attenuation of each of the multipath components of the received signal becomes a time-varying function of the transmitter's path and speed throughout the scattering field local to the transmitter's position. The transmitter's motion causes the received signal strength at a particular portion of the occupied bandwidth to vary as time progresses. In a mobile multipath channel, the overall channel response not only varies across the occupied bandwidth of the signal, but also across time as well.

In addition to multipath, interference is another system component that limits the performance of a communication system. If the system is deployed in an unlicensed band, then other users of the band can generate interference. And in a cellular system employing frequency reuse, transmitters in another cell that is allocated the same set of frequency channels can generate co-channel interference. Frequency reuse is the practice of assigning the same frequency channels to multiple users of the allocated spectrum.

Many cellular communication systems employ the technique of frequency reuse in order to maximize the utilization of the frequency spectrum allocated to a wide-area system deployment. In a cellular system, a large geographical area is divided into smaller regions called cells, where each cell is served by a single base station operating on an assigned set of frequency channels. Within each cell, multiple subscriber devices are allowed to communicate with the base station on the frequency channels assigned to that cell. The concept of frequency reuse involves allocating different sets of frequency channels to the cells belonging to a particular group and then reusing the same sets of frequencies to the cells belonging to another group of cells.

The reuse factor of a cellular system is defined to be the minimum distance between two cells that are allocated the same set of frequency channels divided by the radius of a cell. A cellular system employing a large reuse factor does not utilize the allocated spectrum as efficiently as a cellular system employing a smaller reuse factor. However, the level of co-channel interference received by a receiver in the cellular system is directly dependent on the reuse factor. Reducing the reuse factor tends to increase the level of co-channel interference experienced by a receiver. To better utilize the available spectrum, it would be advantageous to be able to suppress the effects of co-channel interference.

To suppress co-channel interference, adaptive antenna signal processing can be used. In a broadband wireless communication system, adaptive antennas promise to increase system performance and capacity by suppressing interference and providing a diversity gain for equalization. Furthermore, adaptive antennas can increase capacity through Spatial Division Multiple Access (SDMA), where multiple subscriber devices share the same time-frequency channel and are separated on the basis of their spatial channel responses. However, for best performance, the adaptive antenna combining algorithm must be able to compensate for time and frequency variations in the channel responses of both the desired and interference signals. Failure to correct for the channel variations in either time or frequency will result in poor performance.

Thus, there is a need for a method and device for combining the outputs of at least one receive antenna in the presence of severe time variations in the channel response for the purposes of equalization and interference suppression.

DETAILED DESCRIPTION OF THE PRESENTLY PREFERRED EMBODIMENTS

Figure 1:
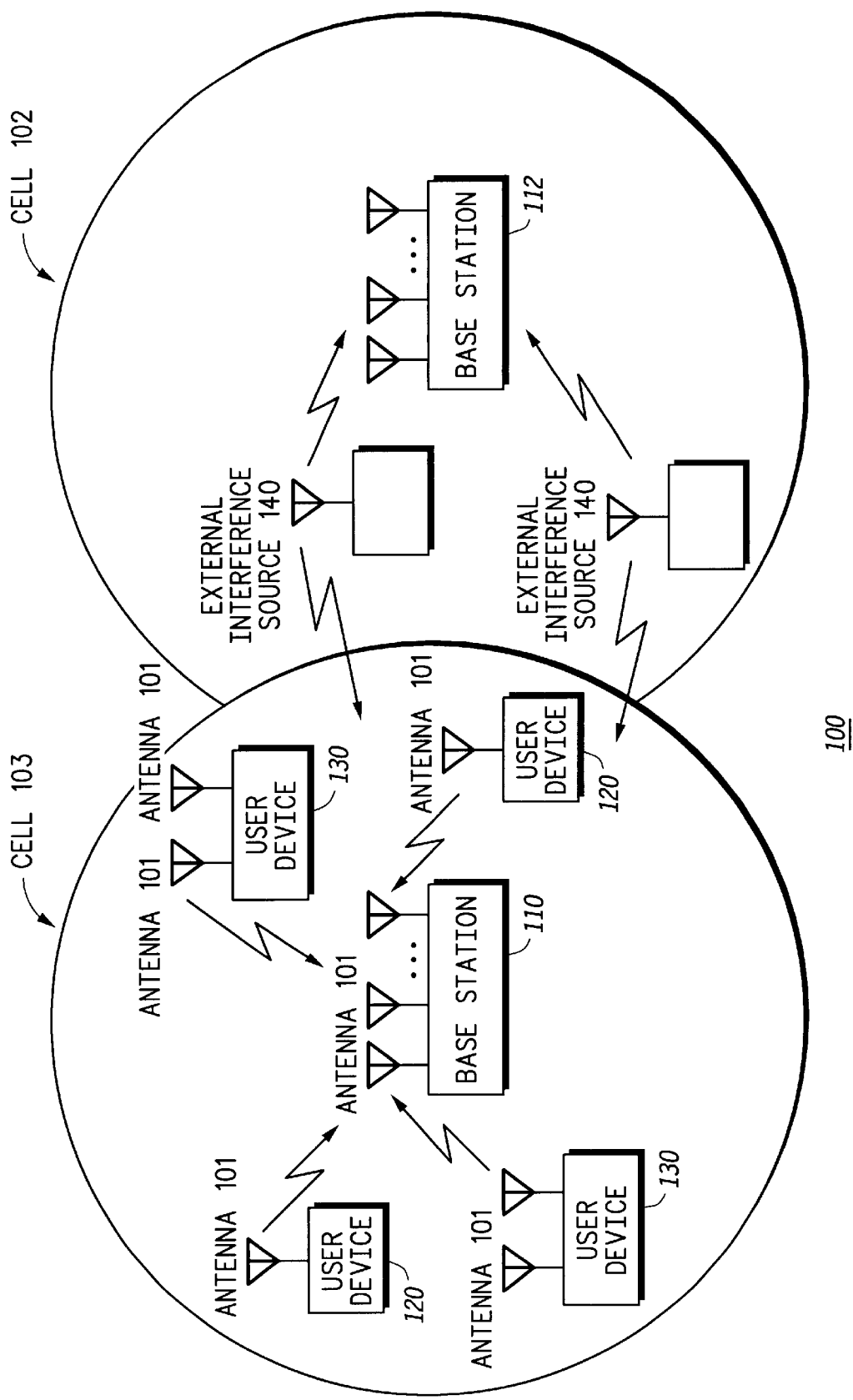
FIG. 1 is an overview diagram of a preferred embodiment of a cellular communication system in accordance with the present invention.

An adaptive antenna array is an array of antennas connected to a communications receiver and operates by combining the signals received by the antennas so as to optimize in an adaptive fashion the receive characteristics of the array. By weighting and then summing the multiple antenna signals, the adaptive antenna array can adapt its angular response, sometimes called the array pattern, while it operates in response to changes in the propagation environment. While operating, the adaptive antenna attempts to maximize the reception of the signal received from a desired transmitting device, as it simultaneously minimizes the effects of all other interfering signals and noise. In a communication system, the interference suppression capability of an adaptive antenna array offers the potential to reduce co-channel interference, compensate for Inter-Carrier Interference (ICI), improve coverage quality, and increase overall system capacity.

Adaptive antenna arrays also offer the possibility of providing a new way of multiplexing multiple devices: Spatial Division Multiple Access (SDMA). With SDMA, multiple devices can simultaneously share the same channel (i.e., time, frequency, or code channel) and are separated and simultaneously decoded by the receiver array on the basis of their spatial position relative to the antenna array. When successfully deployed, SDMA promises to provide enormous increases in system capacity.

In addition, adaptive antenna arrays provide the ability to increase system capacity through Multiple Input/Multiple Output (MIMO) array processing techniques. The MIMO strategy involves deploying multiple antennas on both the transmitter and the receiver. In environments having rich multipath scattering, large increases in capacity can be achieved through appropriate transmit and receive signal processing techniques. An example MIMO strategy calls for each antenna on the transmitter to transmit an independent data stream, and the receive array must deploy SDMA techniques to separate and decode the multiple transmitted streams.

Spatial Division Multiple Access and Multiple-Input/Multiple Output are difficult technologies to implement because of the rapidly varying multipath fading channel. In an SDMA system, the devices that are sharing a channel provide interference to the receiver processing algorithms that must decode the signals transmitted by the devices. When a receiver-processing algorithm attempts to decode one SDMA device, the other SDMA devices provide strong interference to the decoding algorithm. The adaptive antenna implementing SDMA suppresses the effects of the other devices when attempting to decode one of the transmitting devices. In a MIMO system, the multiple antennas of the transmitter interfere with each other at the receive array, and the receiver has similar difficulties as with an SDMA system.

A problem associated with employing both an equalizer and an adaptive antenna in a wireless communication system lies in the design of an algorithm and device having adequate ability to adapt to changes in the signal environment. For best performance, adaptive antennas that operate in a fast-fading multipath environment must adapt to the rapidly varying channel as well as to any changes in the nature of the desired and interfering signals. In a broadband system, a frequency-selective multipath channel will cause significant variations in the channel across the occupied bandwidth of the received signal. Equalization and interference-suppression algorithms, which cannot track these channel variations both in time and frequency, will suffer significant degradation in performance as measured by the Bit-Error Rate (BER) or Signal-to-lnterference-plus-Noise Ratio (SINR).

A common ingredient in many equalizers and adaptive antenna arrays is an algorithm and device that estimates the characteristics of the multipath propagation environment, channel transfer function, or channel frequency response, between the desired transmitting device and each of the at least one receiving antenna at the communication receiver. When SDMA or MIMO is being employed in a broadband system operating in a frequency-selective environment, then an adaptive antenna array generally requires an estimate of the channel frequency response between each receiving antenna and each of the transmitting devices or antennas that are simultaneously sending information to the array. The channel estimation algorithm in this case should operate to simultaneously solve for the channel responses of the multiple transmitting devices or antennas. Performing a simultaneous estimate of the channel responses of multiple transmitting devices is a difficult operation in a mobile broadband communication system operating in a multipath-rich environment with high frequency selectivity. Strong interference caused by an SDMA or MIMO deployment, Doppler induced ICI, or a low reuse factor causes even more difficulty to the channel estimation algorithms. It would therefore be advantageous for a device to be able to compute an accurate channel frequency response estimate in the presence of SDMA interference, MIMO interference, Inter-Symbol Interference (ISI), inter-Carrier interference, and co-channel interference. It would also be advantageous for a device to be able to track any variations in the channel frequency response of multiple mobile users whose channel responses will vary as the users move.

Given the need for higher system capacities in wireless communication systems, adaptive antennas and advanced equalization techniques are important for satisfying the ever-increasing need for high data rate communications. To support the operation of adaptive antennas and equalizers, it is advantageous to have a method and device that tracks the time-varying frequency response of a broadband system accurately enough to permit effective equalization and interference suppression. Given the difficulties associated with implementing SDMA and the deleterious nature of the multipath-fading environment, such a device would enable improved equalization and interference suppression performance in a mobile broadband communication system.

Briefly described, the present invention is a method and device for calculating the adaptive antenna combining weights for the at least one transmitting device for the purposes of jointly equalizing the at least one received signal, while simultaneously suppressing interference in a communication receiver, in order to recover the information transmitted by the at least one transmitting device. In a highly frequency-selective mobile propagation channel, the ability to accurately track the variations in the channel response over both the time and frequency dimensions is critical to the proper operation of any equalization or interference suppression algorithm.

This invention utilizes channel estimations from an existing channel estimation technique to compute combining weights that provide interference suppression and compensate for Doppler induced variations (i.e., ICI).

In order for adaptive antenna combining algorithms to be able to equalize a desired user's signal and/or suppress interference in a mobile wideband digital communication system, the channels of all signals must be accurately tracked across frequency and in time. The present invention's combining algorithms compensate for rapid variations in the channel response and can even compensate for severe channel variations within a data block, where a data block is a group of received time-domain symbols that are transformed into the frequency domain (e.g., with a Discrete Fourier Transform (DFT)).

The method and device of the present invention can be incorporated into a communications receiving device, base station, or subscriber unit. In the present invention, the term "device" can refer to any type of communications device such as a base station, subscriber unit, or other communications receiver or transmitter.

The present invention is implemented in a communication system where at least one desired transmitting device transmits information to a communication receiver having at least one antenna. In a preferred embodiment, pluralities of transmitting devices simultaneously transmit information to a communication receiver having a plurality of antennas. A transmitting device transmits its information in bursts that contain two components: a training interval and a data interval. The information transmitted in a training interval contains pilot symbol sequences of content and duration known by both the transmitting device and the communication receiver. The data interval contains data symbols also called blocks that must be recovered at the receiving device. In the present invention, the term "burst" refers to any one of the following: a short or isolated transmission, a portion of a longer transmission, a portion of a continuous transmission, a portion of a semi-continuous transmission, a time-limited transmission, a bandwidth-limited transmission, or any combination thereof.

The method and device of the present invention provides for a means of weighting and summing the outputs of at least one receive antenna to simultaneously receive and recover the information transmitted simultaneously by at least one transmitting device. Also if more than one antenna is present at the communication receiver, then the method and device of the present invention can be used to enable an adaptive antenna to mitigating the effects of unwanted interference transmitted by other users of the occupied bandwidth, as well as motion induced ICI, and ISI.

The ability to receive and recover the information transmitted simultaneously by more than one device significantly increases the capacity of the communication system. Conventional cellular systems permit only one device to transmit on a particular frequency channel within a cell for any predetermined time interval. Providing for more than one device to transmit to a base station on the same frequency channel at the same time will multiply the capacity of the system by a factor equal to the number of devices that are allowed to simultaneously transmit. Devices incorporating algorithms for providing this capability must have the ability to compensate for time and frequency variations in each desired transmitter's and each interferer's channel. The method and device of the present invention provide adaptive antenna interference suppression and equalization, utilizing new combining weight techniques, making communication systems more efficient.

A preferred embodiment of the present invention described below typically operates in a time-varying delay-spread channel and operates under the assumption that the channel can change significantly over the occupied bandwidth and significantly in time. This invention requires channel estimates from multi-user channel estimation technique that tracks the time and frequency variations of multiple transmitting devices (or antennas) sharing the same time-frequency channel.

One limiting factor to the implementation of adaptive antenna combining weights in broadband communications is ISI, which can cause severe frequency selectivity. Equalizing or suppressing interference in a broadband channel with traditional time-domain techniques becomes a complex problem when the channel length becomes much larger than the symbol time. As a result, Orthogonal Frequency Division Multiplexing (OFDM) and frequency-domain equalization techniques have been proposed to combat the high level of ISI that is typical in broadband channels.

An additional problem occurs when the end-users are mobile. The speed of the mobiles causes significant time variations necessitating combining weights that compensate for the variations in the desired transmitter's and unknown interferer's channels. The present invention uses a conceptual model that characterizes the time-varying channel between a single transmit and single receive antenna as the sum of multiple time-invariant channels called "Doppler" channels. This is done through the following equation:

$$h_u(l, n) = \sum_{v=-V}^{+V} h_{u,v}(n) e^{-j2\pi v l/N_k} e^{j2\pi v n/N_k}$$

where $h_u(l,n)$ is the time-varying channel at time n for desired transmitting device u for l=0 ... L−1, $N_k$ is the Doppler DFT size (described below), and $h_{u,v}(n)$ is the $v^{th}$ time-domain Doppler channel for user u.

The method and device of the present invention uses the time-invariant Doppler channel estimates for each user to get Minimum Mean Squared Error (MMSE) weights. The weights are produced depending on whether the Doppler channel estimates are for regular cyclic prefix communication systems (e.g., OFDM), or are for communication systems that do not employ cyclic prefixes. The first sets of weights are linear MMSE weights that attempt to correct for Doppler induced time variations even over a baud. These weights will vary from baud to baud. The second set of weights are fixed in time linear MMSE combining weights that compensate for time variation even though they are constant in time. An important advantage of the fixed in time combining weights are that they greatly reduce the computational complexity over combining weights that are computed at each baud.

FIG. 1, numeral 100, illustrates a wireless communication system in accordance with the preferred embodiment of the present invention. As shown in FIG. 1, a Base Station 110 provides communication service to a geographic region known as a cell 103. At least one User Devices 120 and 130 communicate with the Base Station 110. In some embodiments of the communication system of FIG. 1, at least zero External Interference Sources 140 share the same spectrum allocated to the base station 110 and subscriber devices 120 and 130. The External Interference Sources 140 represent an unwanted source of emissions that interferes with the communication process between the Base Station 110 and the User Devices 120 and 130. The exact nature and number of the External Interference Sources 140 will depend on the specific embodiment of the communication system of FIG. 1. In some cases, as is shown in FIG. 1, an External Interference Source will be another User Device 140 (similar in construction and purpose to User Device 120) that is communicating with another Base Station 112 in the same frequency spectrum allocated to Base Station 110 and User Devices 120 and 130. As shown in FIG. 1, User Devices 120 has a single antenna, while User Devices 130 have at least one antenna. The method and device of the present invention can be implemented as part of a Base Station 110 as well as part of a User Device 120 or 130.

Figure 2:
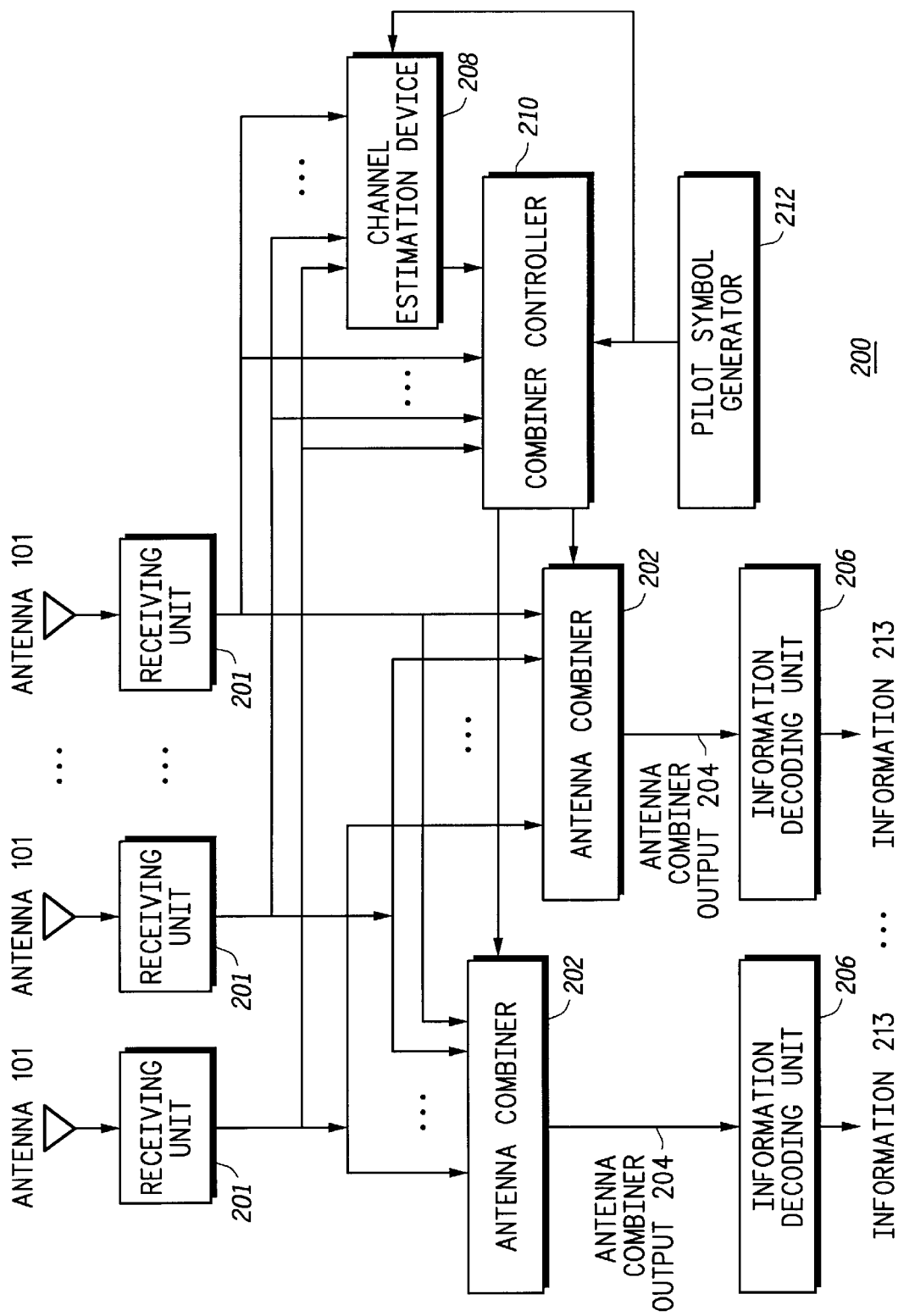
FIG. 2 is a block diagram illustrating a preferred embodiment of a device in accordance with the present invention.

FIG. 2, numeral 200, is a block diagram illustrating a device in accordance with the present invention. The communication receiver in accordance with the present invention includes at least one antenna (101) wherein the outputs of the antennas are each provided to a receiving unit (201). The outputs of the receiving units (201) are provided to at least one Antenna Combiner (202). The signals from the receiving units (201) are also fed into the Combiner Controller (210), which regulate the operation of the at least one Antenna Combiner (202). The signals from the receiving units (201) are also fed into the Channel Estimation Device (208). The Pilot Symbol Generator (212) generates pilot symbol information that is used by the Combiner Controller (210) to control the Antenna Combiner (202). The pilot symbol information generated by the Pilot Symbol Generator (212) is also used by the Channel Estimation Device (208) to estimate the time-varying frequency responses of the transmitting devices (110, 112, 120, 130, or 140, or any combination thereof). The output of an Antenna Combiner (202) is fed into an Information Decoding Unit (206), which decodes the Antenna Combiner Output (204) and generates data information (213) that was received by the Antennas (101).

Figure 3:
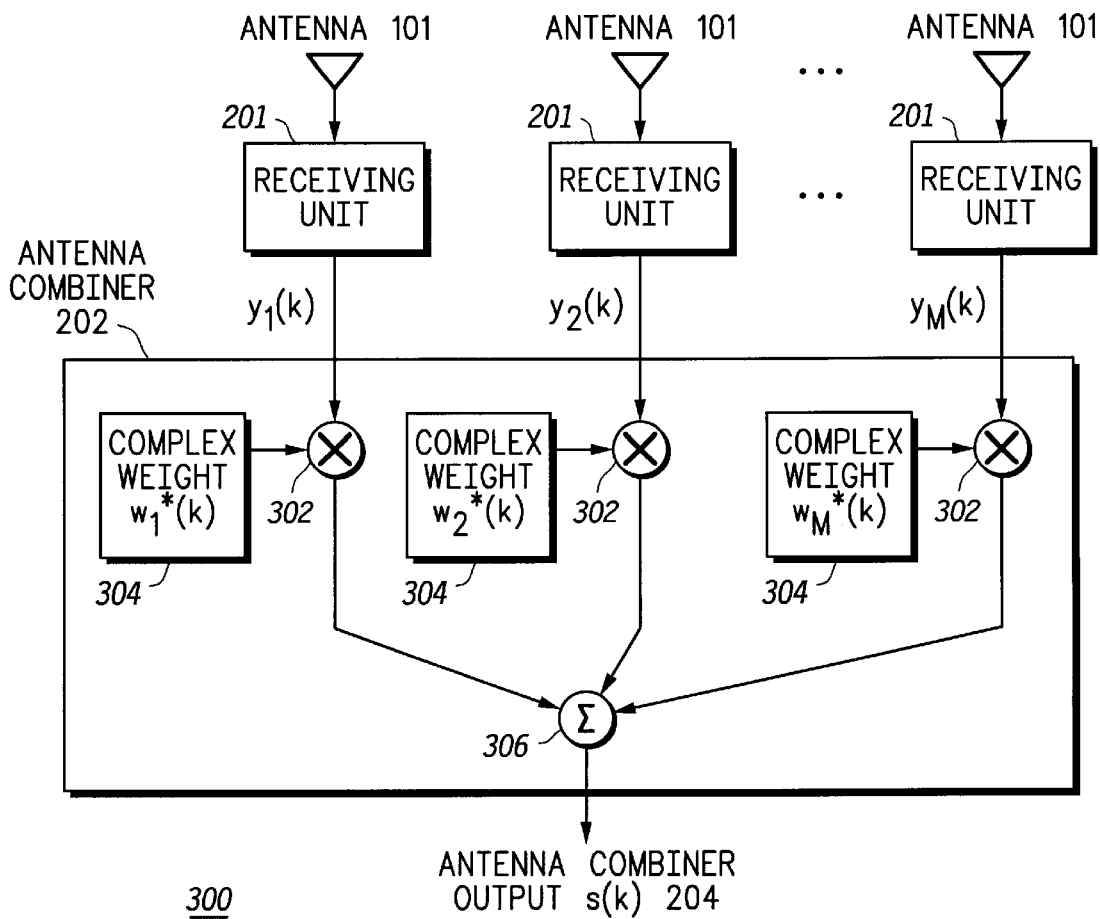
FIG. 3 is a block diagram illustrating details of the Antenna Combiner of the device of FIG. 2.

FIG. 3, numeral 300, is a block diagram illustrating details of the Antenna Combiner of the device of FIG. 2. Antenna Combiner (202) is coupled to the receiving units (201), which in turn are coupled to the antennas (101). In a preferred embodiment, the receiving units (201) may include radio frequency pre-amplifiers, filters, and other devices that can be used to convert the radio frequency signal received by the antenna down to a digital stream of baseband equivalent complex symbols. As shown in FIG. 2, the output of the i'th receiving unit (201) (where i is an integer between 1 and M inclusive, and M is the total number of antenna elements) is mathematically denoted by $y_i(k)$, where k and i are integers, and is provided to the antenna combiner (202) which can be in the form of a plurality of complex multipliers (302) which multiply the output of each receiving unit (201) by a complex weight (304), mathematically denoted as $w_i(k)$, and a combiner (306) sums the outputs of the plurality of complex multipliers (302). The values of the complex weights (304) are controlled by the Combiner Controller (210), which are described in more detail below.

Figure 4:
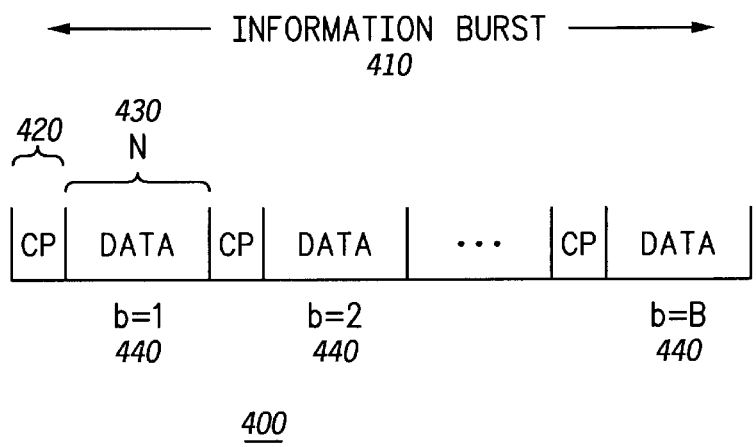
FIG. 4 is a representation of an information burst for a communication system with regular cyclic prefixes.

FIG. 4, numeral 400, is a timing diagram illustrating the structure of an information burst for a communication system with regular cyclic prefixes (420) transmitted between a plurality of transmitting devices (e.g., Base station 110, User Device 120, or 130) and a receiving device (e.g., Base station 110, User Device 120, or 130). An information burst (410) includes a cyclic prefix (420) preceding each of the at least one blocks (data interval) which are of length N (430). A cyclic prefix (420) is a repetition of the last $L_{cp}$ (where $L_{cp}$ is typically chosen to be longer than the expected channel length in time-domain samples) data symbols right before a data block (430). It should be noted that by blocks it is meant the N symbols that are DFT'd into the frequency domain for processing. The various blocks being transmitted are representing by the integer "b" (440).

The channel estimation device (208) provides a Doppler channel estimate for the at least one desired transmitters that is used by the Combiner Controller (210) to produce combining weights utilizing the method and device of the present invention for regular cyclic prefixes. The regular cyclic prefix combining weight calculations are expressed in FIG. 6, and their derivations are mentioned here: The received time-domain signal on an M element array for baud b is modeled as:

$$(M \times 1) y(n, b) = \sum_{u=1}^{U} \sum_{v=-V}^{V} \sum_{l=0}^{L-1} h_{u,v}(l) x_u((n-l)_N, b) e^{j2\pi v(n_b+n-l)/N_k} + n(n, b) \quad (1)$$

where U is the number of SDMA users (or transmit streams of Multiple-Input/Multiple-Output (MIMO) systems), $V_T=2V+1$ is the number of Doppler channels, L is the number of time-taps in the model for Doppler channels (L is assumed to be less than or equal to the cyclic prefix length), $h_{u,v}(l)$ is user u's $v^{th}$ time-domain Doppler channel, $x_u(n,b)$ is user u's time domain symbols for baud b, $(n)_N$ means n mod N and is used to model the cyclic prefix before $x_u(n,b)$, N is the DFT size, $n_b$ is the absolute time reference of baud b (e.g., if baud 1 starts at time $n_1=0$, then baud b would be at time $n_b=(b-1)(N+L_{cp})$ where $L_{cp}$ is the length of the cyclic prefix), and $N_k$ is the Doppler DFT size (typically chosen to be twice the size of the total number of time-domain symbols in a burst).

The frequency-domain symbols on block b are given as the DFT of y(n,b):

$$Y(k, b) = \frac{1}{\sqrt{N}} \sum_{n=0}^{N-1} y(n, b) e^{-j2\pi kn/N} \tag{2}$$

$$Y(k, b) = \frac{1}{\sqrt{N}} \sum_{u=1}^{U} \sum_{v=-V}^{V} e^{j2\pi v n_b/N_k} \sum_{l=0}^{L-1} g_{u,v}(l) \sum_{n=0}^{N-1} x_u((n-l)_N, b) q_v(n) e^{-j2\pi kn/N} + N(k, b) \tag{3}$$

where:

$$N(k, b) = \frac{1}{\sqrt{N}} \sum_{n=0}^{N-1} n(n, b) e^{-j2\pi kn/N}, \quad g_{u,v}(l) = h_{u,v}(l) e^{-j2\pi vl/N_k}, \tag{4}$$

and $q_v(n) = e^{j2\pi v n/N_k}$

Let $$Z_{u,l}(k, b) = \frac{1}{\sqrt{N}} \sum_{n=0}^{N-1} x_u((n-l)_N, b) e^{-j2\pi kn/N} = X_u(k, b) e^{-j2\pi kl/N} \tag{5}$$

where $X_u(k,b)$ is user u's frequency-domain symbols on subcarrier k and baud b. Using (5) and the DFT property for multiplication of two time-domain waveforms, $Y(k,b)$ can be expressed as:

$$Y(k, b) = \tag{6}$$
$$\frac{1}{\sqrt{N}} \sum_{u=1}^{U} \sum_{v=-V}^{V} e^{j2\pi v n_b/N_k} \sum_{l=0}^{L-1} g_{u,v}(l) (Z_{u,l}(k, b) \Theta Q_v(k)) + N(k, b)$$

where $\Theta$ means N-point circular convolution, and $$Q_v(k) = \frac{1}{\sqrt{N}} \sum_{n=0}^{N-1} q_v(n) e^{-j2\pi kl/N} \tag{7}$$

With further simplification, $Y(k,b)$ can be expressed as:

$$Y(k, b) = \tag{8}$$
$$\frac{1}{\sqrt{N}} \sum_{u=1}^{U} \sum_{v=-V}^{V} e^{j2\pi v n_b/N_k} \sum_{f=0}^{K-1} X_u(k, b) Q_v((k-f)_N) G_{u,v}(f) + N(k, b)$$

where K is the number of subcarriers with data ($K \leq N$ for OFDM and K=N for single-carrier communication systems) and $G_{u,v}(k)$ is:

$$G_{u,v}(k) = \sum_{l=0}^{L-1} g_{u,v}(l) e^{-j2\pi kl/N} \tag{9}$$

Using the expression for $Y(k,b)$ in (8) and $$E[X_u(k,b) X^*_j(f,t)] = \delta(u-j)\delta(k-f)\delta(t-b),$$

Doppler MMSE combining weights for user u are found as the solution to:

$$\min_{w_u(k, b)} E|w_u^H(k, b) Y(k, b) - X_u(k, b)|^2 \tag{10}$$

The solution to this equation is:

$$w_u(k,b) = (R(k,b) + R_c(k,b))^{-1} p_u(k,b) \tag{11}$$

where:

$$R(k, b) = \frac{1}{N} \sum_{u=1}^{U} \sum_{v=-V}^{V} \sum_{w=-V}^{V} \tag{12}$$
$$e^{j2\pi(v-w)n_b/N_k} \sum_{f=0}^{K-1} Q_v((k-f)_N) Q_w^*((k-f)_N) G_{u,v}(f) G_{u,w}^*(f)$$

$$p_u(k, b) = \frac{1}{\sqrt{N}} \sum_{v=-V}^{V} e^{j2\pi v n_b/N_k} Q_v(0) G_{u,v}(k) \tag{13}$$

and $R_c(k,b)$ is the spatial covariance matrix of the corrupting environment. One example for $R_c(k,b)$ is for the case where there is little or no unknown interferers and only additive white Gaussian noise. For this case, $R_c(k,b)$ is given as:

$$R_c(k,b) = \sigma_n^2 I \tag{14}$$

where $\sigma_n^2$ is the frequency-domain noise power.

Figure 8:
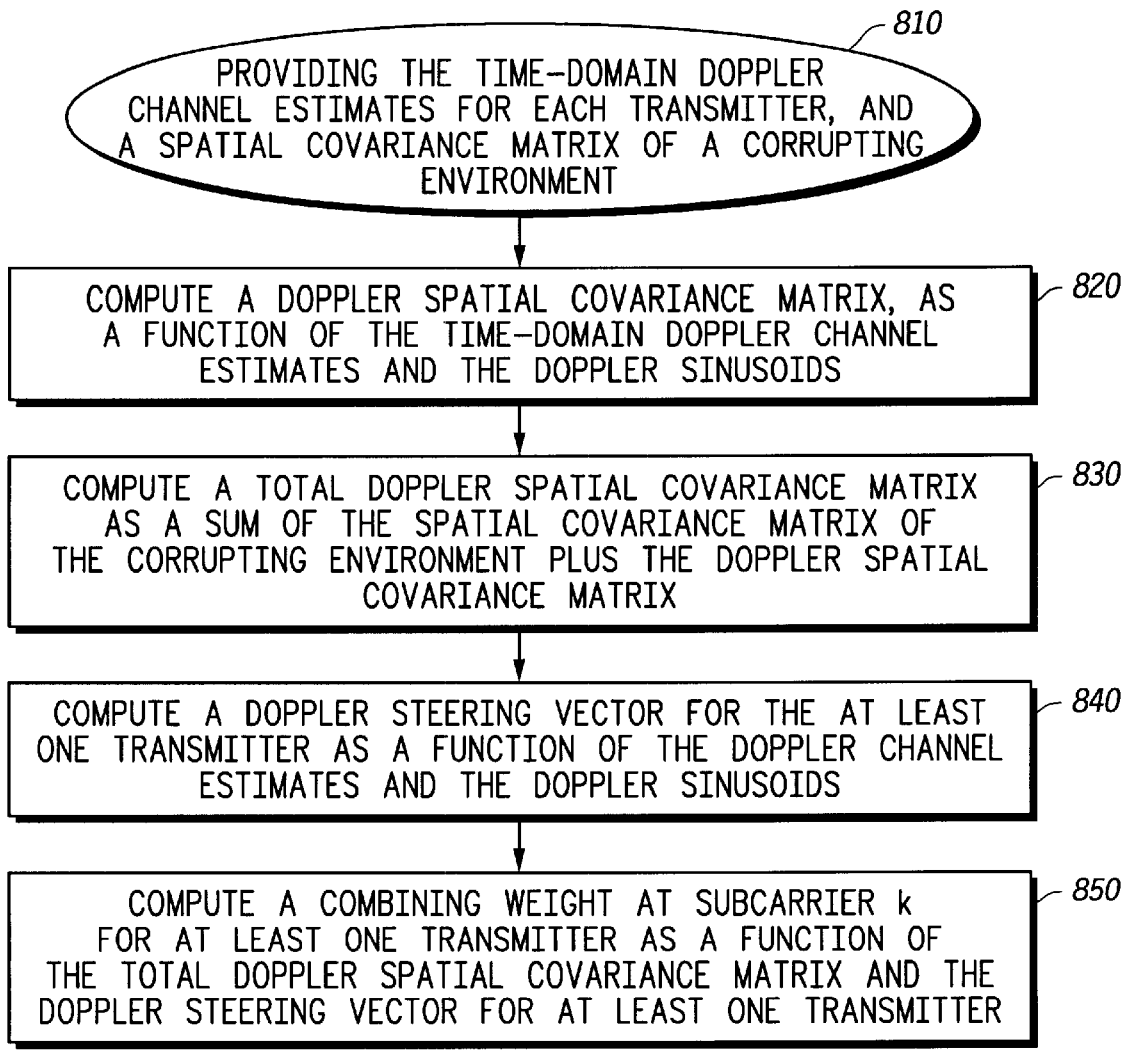
FIG. 8 is a flow chart representation of a preferred embodiment of the method performed by the device of FIG. 2 for computing fixed in time combining weights for communication systems with regular cyclic prefixes, in accordance with the present invention.

The fixed in time regular cyclic combining weight calculations are expressed in FIG. 8, and their derivations are mentioned here: Modifying (10) through (14) to cover all bauds (b=1 . . . B), fixed weights in time can be found for communication systems with regular cyclic prefixes by solving:

$$\min_{w_u(k)} E\left\{ \sum_{b=1}^{B} |w_u^H(k) Y(k, b) - X_u(k, b)|^2 \right\}$$

The solution to this equation is:

$$w_u(k) = (R(k) + R_c(k))^{-1} p_u(k)$$

where:

$$R(k) = \frac{1}{N} \sum_{b=1}^{B} \sum_{u=1}^{U} \sum_{v=-V}^{V} \sum_{w=-V}^{V} e^{j2\pi(v-w)n_b/N_k}$$
$$\sum_{f=0}^{K-1} Q_v((k-f)_N) Q_w^*((k-f)_N) G_{u,v}(f) G_{u,w}^*(f)$$

$$p_u(k) = \frac{1}{\sqrt{N}} \sum_{b=1}^{B} \sum_{v=-V}^{V} e^{j2\pi v n_b/N_k} Q_v(0) G_{u,v}(k)$$

$Q_v(k)$ is defined in (7), $G_{u,v}(k)$ is defined in (9), and $R_c(k)$ is the spatial covariance matrix of the corrupting environment. One example for $R_c(k)$ is for the case where there is little or no unknown interferers and only additive white Gaussian noise. For this case, $R_c(k)$ is given as: $R_c(k) = \sigma_n^2 I$ where $\sigma_n^2$ is the frequency-domain noise power.

Figure 5:
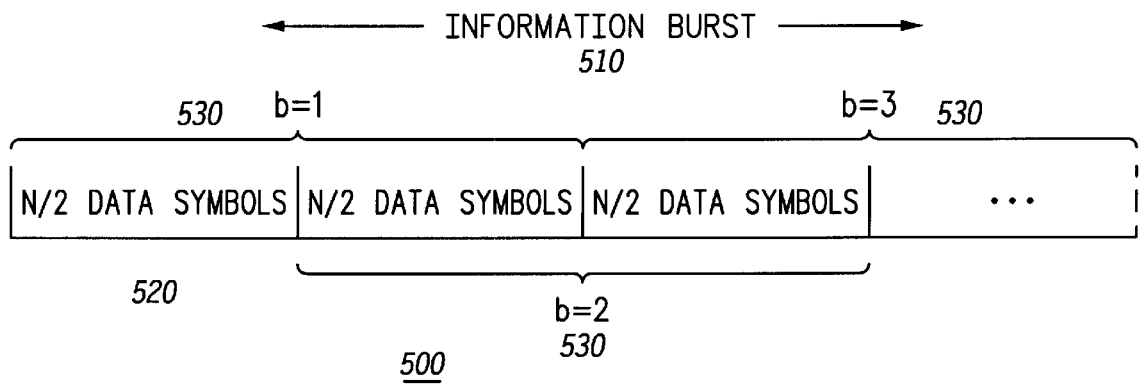
FIG. 5 is a representation of an information burst for a communication system with no cyclic prefixes.

FIG. 5, numeral 500 is the preferred embodiment of a timing diagram illustrating the structure of an information burst for a communication system with no cyclic prefixes, using the frequency-domain processing technique of overlap and save. This is being transmitted between a plurality of transmitting devices (e.g., Base station 110, User Device 120, or 130) and a receiving device (e.g., Base station 110, User Device 120, or 130). An information burst (510) is comprised of overlapping blocks (data intervals), N (520). Again, it should be noted that by blocks it is meant the N symbols that are DFT'd into the frequency domain for processing. The various blocks being transmitted are representing by an integer, "b" (530). Note that in 510, the blocks (530) overlap due to the method of overlap and save only estimating N/2 time-domain symbols at each block (the first N/2 symbols are thrown away since they include aliasing from the circular convolution).

The combining weights given in equations (11) through (14) are only valid for communication systems with regular cyclic prefixes and also are only optimized to the DC (i.e., v=0) Doppler signal. An alternate derivation for the combining weights can be given that is valid for communication systems with a regular cyclic prefix (410) or for communication systems that do not use cyclic prefixes (510) and also for combining weights that are optimized to any of the Doppler signals. The no cyclic prefix combining weight calculations are expressed in FIG. 7, and their derivations are mentioned here: Model the received time-domain signal on block b as $$y(n, b) = \sum_{u=1}^{U} \sum_{v=-V}^{V} \sum_{l=0}^{L-1} h_{u,v}(l) z_u(n-l, b) e^{j2\pi v n_b/N_k} + n(n, b) \quad (15)$$

where for systems with regular cyclic prefixes:

$$z_{u,v}(n,b) = x_u((n)_N, b) e^{j2\pi v n/N_k} \quad (16)$$

and for systems with no cyclic prefixes:

$$z_{u,v}(n,b) = x_u(n,b) e^{j2\pi v n/N_k} \quad (17)$$

The frequency-domain received symbols on block b are given as:

$$Y(k, b) = \frac{1}{\sqrt{N}} \sum_{n=0}^{N-1} y(n, b) e^{-j2\pi kn/N} \quad (18)$$

With some manipulation, Y(k,b) becomes:

$$Y(k, b) = \frac{1}{\sqrt{N}} \sum_{u=1}^{U} \sum_{v=-V}^{V} e^{j2\pi v n_b/N_k} \sum_{l=0}^{L-1} h_{u,v}(l) Z_{u,v,l}(k, b) + N(k, b) \quad (19)$$

where $$Z_{u,v,l}(k, b) = \sum_{n=0}^{N-1} z_{u,v}(n-l, b) e^{-j2\pi kn/N} \quad (20)$$

In order to find the MMSE Doppler weights for these communication system, the correlation function between $Z_{u,v,l}(k,b)$ and $Z_{u,w,t}(k,b)$ is needed. This will be represented by $R_z(v,w,l,t,k)$. For systems with regular cyclic prefixes, it can be shown that $R_z(v,w,l,t,k)$ is given as:

$$R_z(v, w, l, t, k) = e^{-j2\pi k(l-t)/N} \begin{bmatrix} \sum_{n=\max(0,l-t)}^{\min(N-1,N-1+l-t)} e^{j2\pi(v-w)(n-l)/N_k} + \\ \sum_{n=0}^{l-t-1} e^{j2\pi(v-w)(n-l)/N_k} e^{-j2\pi w N/N_k} + \\ \sum_{n=N+l-t}^{N-1} e^{j2\pi(v-w)(n-l)/N_k} e^{j2\pi w N/N_k} \end{bmatrix} \quad (21)$$

For communication systems that do not use cyclic prefixes, it can be shown that $R_z(v,w,l,t,k)$ is given as:

$$R_z(v,w,l,t,k) = e^{-j2\pi k(l-t)/N} e^{-j2\pi(v-w)l/N_k} \alpha(v-w) \quad (22)$$

where:

$$\alpha(v) = \sum_{n=0}^{N-1} e^{j2\pi v n/N_k} \quad (23)$$

With the correlation function, user u's Doppler MMSE combining weights for the vth Doppler channel can be found as the solution to the following equation:

$$\min_{w_{u,v}(k, b)} E|w_{u,v}^H(k, b) Y(k, b) - Z_{u,v,0}(k, b)|^2 \quad (24)$$

The solution to this equation is:

$$w_{u,v}(k,b) = (R(k,b) + R_c(k,b))^{-1} p_{u,v}(k,b) \quad (25)$$

where:

$$R(k, b) = \quad (26)$$

$$\frac{1}{N} \sum_{u=1}^{U} \sum_{v=-V}^{V} \sum_{w=-V}^{V} e^{j2\pi(v-w)n_b/N_k} \sum_{l=0}^{L-1} \sum_{t=0}^{L-1} h_{u,v}(l) h_{u,w}^H(t) R_z(v, w, l, t, k)$$

$$p_{u,v}(k, b) = \frac{1}{\sqrt{N}} \sum_{w=-V}^{V} e^{j2\pi w n_b/N_k} \sum_{l=0}^{L-1} h_{u,w}(l) R_z(w, v, l, 0, k) \quad (27)$$

and $R_c(k,b)$ is the spatial covariance matrix of the corrupting environment. One example for $R_c(k,b)$ is for the case where there is little or no unknown interferers and only additive white Gaussian noise. For this case, $R_c(k,b)$ is given as:

$$R_c(k,b) = \sigma_n^2 I \quad (28)$$

where $\sigma_n^2$ is the frequency-domain noise power.

It can be shown that for communication systems with no cyclic prefixes that (26) and (27) reduce down to:

$$R(k, b) = \frac{1}{N} \sum_{u=1}^{U} \sum_{v=-V}^{V} \sum_{w=-V}^{V} e^{j2\pi(v-w)n_b/N_k} \alpha(v-w) G_{u,v,w}(k) H_{u,w}^H(k) \quad (29)$$

$$p_{u,v}(k, b) = \frac{1}{\sqrt{N}} \sum_{w=-V}^{V} e^{j2\pi w n_b/N_k} G_{u,v,w}(k) \alpha(w-v) \quad (30)$$

where:

$$G_{u,v,w}(k) = \sum_{l=0}^{L-1} h_{u,v}(l) e^{-j2\pi(v-w)l/N_k} e^{-j2\pi kl/N} \quad (31)$$

$$H_{u,v}(k) = \sum_{l=0}^{L-1} h_{u,v}(l) e^{-j2\pi kl/N} \quad (32)$$

Figure 9:
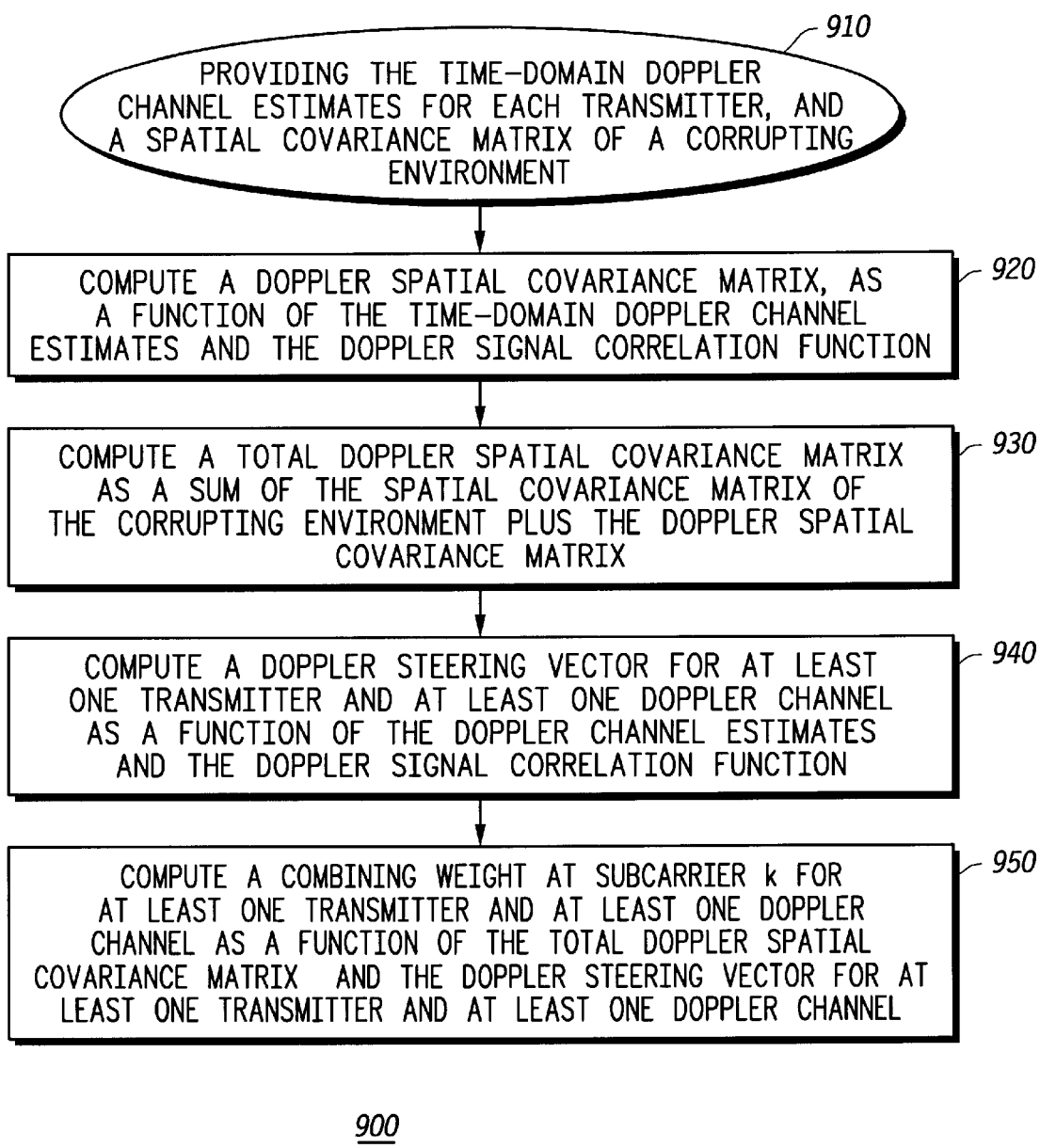
FIG. 9 is a flow chart representation of a preferred embodiment of the method performed by the device of FIG. 2 for computing fixed in time combining weights for communication systems with regular cyclic or no cyclic prefixes, in accordance with the present invention.

The fixed-in-time no-cyclic-prefix combining weight calculations are expressed in FIG. 9, and their derivations are mentioned here: Modifying (24) through (28) to cover all bauds (b=1. . . B), fixed weights in time can be found by solving:

$$\min_{w_{u,v}(k)} E\left\{ \sum_{b=1}^{B} |w_{u,v}^H(k,b)Y(k,b) - Z_{u,v,0}(k,b)|^2 \right\} \quad (33)$$

The solution to this equation is:

$$w_{u,v}(k) = (R(k) + R_c(k,b))^{-1} p_{u,v}(k) \quad (34)$$

where:

$$R(k) = \frac{1}{N} \sum_{b=1}^{B} \sum_{u=-V}^{U} \sum_{v=-V}^{V} \sum_{w=-V}^{V} \quad (35)$$
$$e^{j2\pi(v-w)n_b/N_k} \sum_{l=0}^{L-1} \sum_{t=0}^{L-1} h_{u,v}(l) h_{u,w}^H(t) R_z(v,w,l,t,k)$$

$$p_{u,v}(k) = \frac{1}{\sqrt{N}} \sum_{b=1}^{B} \sum_{w=-V}^{V} e^{j2\pi w n_b/N_k} \sum_{l=0}^{L-1} h_{u,w}(l) R_z(w,v,l,0,k) \quad (36)$$

and $R_c(k)$ is the spatial covariance matrix of the corrupting environment. One example for $R_c(k)$ is for the case where there is little or no unknown interferers and only additive white Gaussian noise. For this case, $R_c(k)$ is given as:

$$R_c(k) = \sigma_n^2 I \quad (37)$$

where $\sigma_n^2$ is the frequency-domain noise power.

Figure 6:
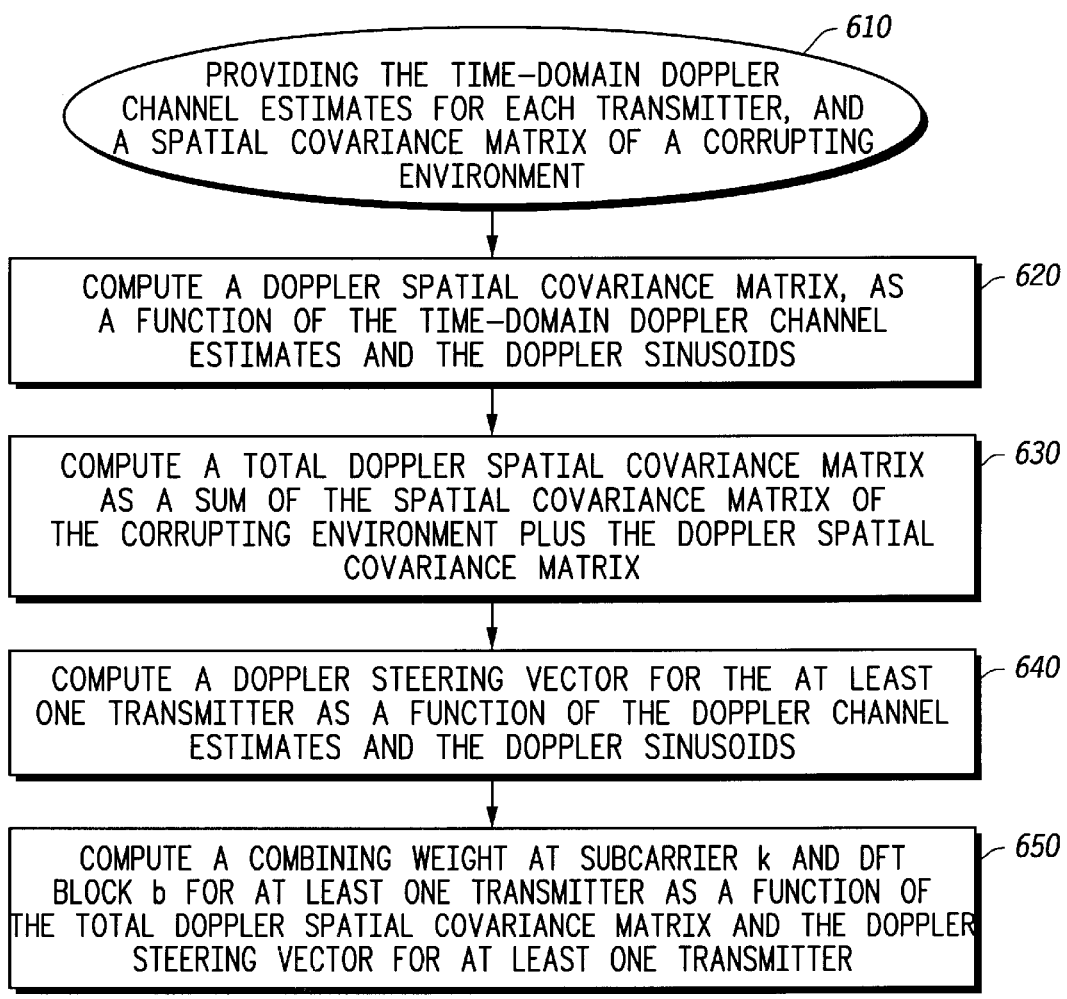
FIG. 6 is a flow chart representation of a preferred embodiment of the method performed by the device of FIG. 2 for computing combining weights for communication systems with regular cyclic prefixes, in accordance with the present invention.

FIG. 6, numeral 600, is a flow chart representation of combining weight calculations for communication systems with regular cyclic prefixes, in accordance with the present invention. The process is provided the time-domain Doppler channel estimates for each transmitter, and a spatial covariance matrix of a corrupting environment (610) from the channel estimation device 208. With this, a Doppler spatial covariance matrix is computed as a function of the time-domain Doppler channel estimates and the Doppler sinusoids (620). As previously mentioned, the spatial covariance matrix is:

$$R(k,b) = \frac{1}{N} \sum_{u=1}^{U} \sum_{v=-V}^{V} \sum_{w=-V}^{V}$$
$$e^{j2\pi(v-w)n_b/N_k} \sum_{f=0}^{K-1} Q_v((k-f)_N) Q_w^*((k-f)_N) G_{u,v}(f) G_{u,w}^*(f)$$

where:

$$Q_v(k) = \frac{1}{\sqrt{N}} \sum_{n=0}^{N-1} q_v(n) e^{-j2\pi kl/N}, \quad G_{u,v}(k) = \sum_{l=0}^{L-1} g_{u,v}(l) e^{-j2\pi kl/N},$$

$$g_{u,v}(l) = h_{u,v}(l) e^{-j2\pi v l/N_k}, \text{ and } q_v(n) = e^{j2\pi v n/N_k}.$$

$h_{u,v}(l)$ are the time-domain Doppler channels for user u, and $q_v(n)$ are the Doppler sinusoids. Next, the process (630) computes a total Doppler spatial covariance matrix as a sum of the spatial covariance matrix of the corrupting environment, plus the Doppler spatial covariance matrix $[R_T(k,b) = R(k,b) + R_c(k,b)]$. The Doppler steering vector ($p_u(k,b)$) is computed for the at least one transmitter as a function of the Doppler channel estimates and the Doppler sinusoids (640), $$p_u(k,b) = \frac{1}{\sqrt{N}} \sum_{v=-V}^{V} e^{j2\pi v n_b/N_k} Q_v(0) G_{u,v}(k).$$

The combining weight at subcarrier k and DFT block b may now be computed for at least one transmitter and at least one Doppler channel as a function of the total Doppler spatial covariance and the Doppler steering vector (650), $w_u(k,b) = (R_T(k,b))^{-1} p_u(k,b)$.

Figure 7:
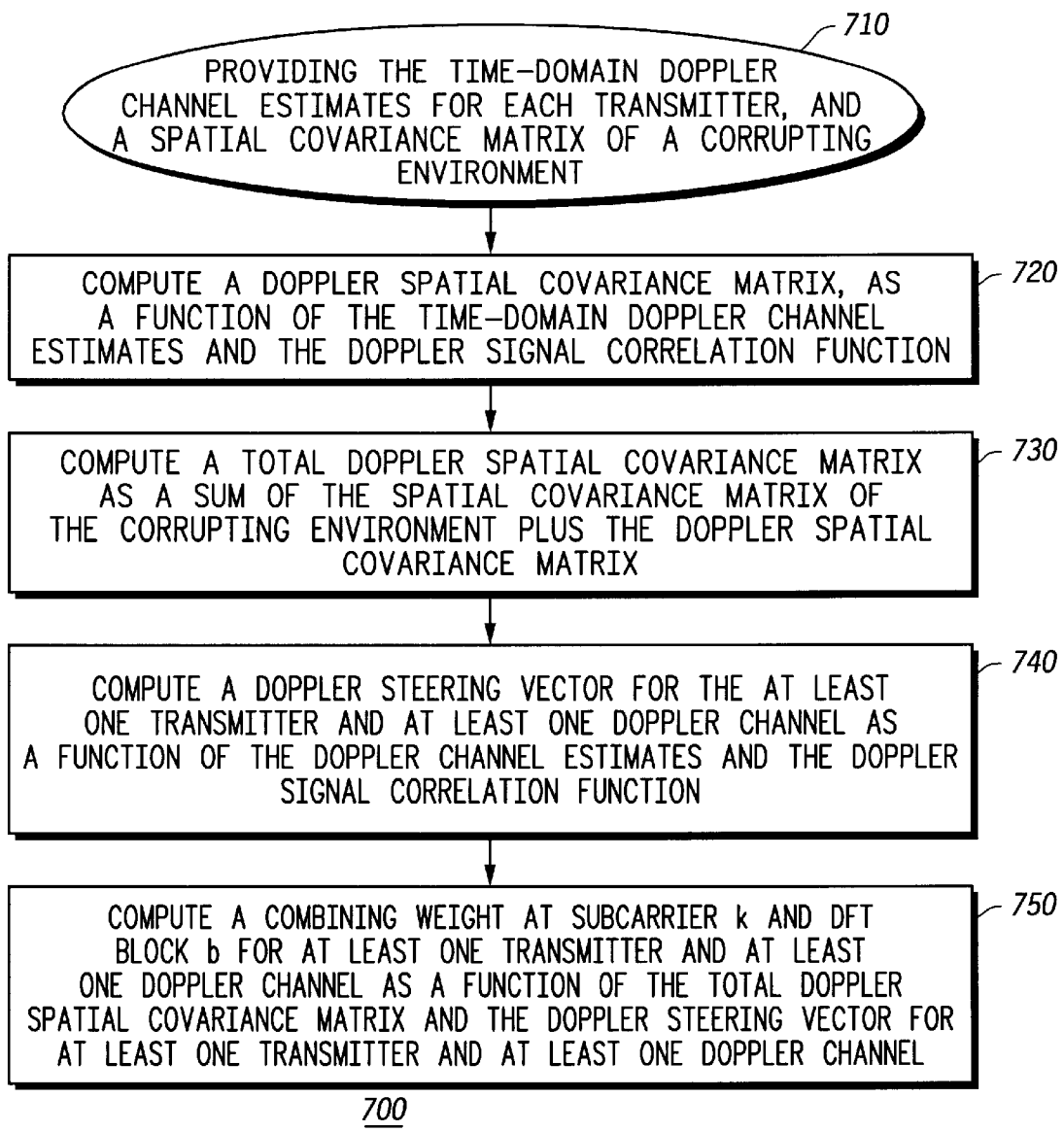
FIG. 7 is a flow chart representation of a preferred embodiment of the method performed by the device of FIG. 2 for computing combining weights for communication systems with regular cyclic or no cyclic prefixes, in accordance with the present invention.

FIG. 7, numeral 700, is a flow chart representation of combining weight calculations for communication systems with regular cyclic prefixes or no cyclic prefixes, in accordance with the present invention. The process is provided the time-domain Doppler channel estimates for each transmitter, and a spatial covariance matrix of a corrupting environment (710) from the channel estimation device 208. The method is to compute a Doppler spatial covariance matrix as a function of the time-domain Doppler channel estimates and the Doppler signal correlation function (720). This is equated as $$R(k,b) =$$
$$\frac{1}{N} \sum_{u=1}^{U} \sum_{v=-V}^{V} \sum_{w=-V}^{V} e^{j2\pi(v-w)n_b/N_k} \sum_{l=0}^{L-1} \sum_{t=0}^{L-1} h_{u,v}(l) h_{u,w}^H(t) R_z(v,w,l,t,k)$$

where $h_{u,v}(l)$ are the time-domain Doppler channels for user u and $R_z(v,w,l,t,k)$ is the Doppler signal correlation function which is given as (for communication systems with regular cyclic prefixes)

$$R_z(v,w,l,t,k) = e^{-j2\pi k(l-t)/N} \begin{bmatrix} \sum_{n=\max(0,l-t)}^{\min(N-1,N-1+l-t)} e^{j2\pi(v-w)(n-l)/N_k} + \\ \sum_{n=0}^{l-t-1} e^{j2\pi(v-w)(n-l)/N_k} e^{-j2\pi w N/N_k} + \\ \sum_{n=N+l-t}^{N-1} e^{j2\pi(v-w)(n-l)/N_k} e^{j2\pi w N/N_k} \end{bmatrix}$$

And $R_z(v,w,l,t,k)$ for communication systems with no cyclic prefixes equates as $R_z(v,w,l,t,k)=e^{-j2\pi k(l-t)/N}e^{-j2\pi(v-w)l/N_k}\alpha(v-w)$, where:

$$\alpha(v) = \sum_{n=0}^{N-1} e^{j2\pi vn/N_k}$$

The Doppler spatial covariance matrix for communication systems with no cyclic prefixes can also be expressed as:

$$R(k,b) = \frac{1}{N}\sum_{u=1}^{U}\sum_{v=-V}^{V}\sum_{w=-V}^{V} e^{j2\pi(v-w)n_b/N_k}\alpha(v-w)G_{u,v,w}(k)H_{u,w}^H(k)$$

where $$\alpha(v) = \sum_{n=0}^{N-1} e^{j2\pi vn/N_k},\ G_{u,v,w}(k) = \sum_{l=0}^{L-1} h_{u,v}(l)e^{-j2\pi(v-w)l/N_k}e^{-j2\pi kl/N},$$

and $H_{u,v}(k) = \sum_{l=0}^{L-1} h_{u,v}(l)e^{-j2\pi kl/N}$.

Next, (730) the Doppler spatial covariance matrix $R_T(k,b)$ is computed as a sum of the spatial covariance matrix of the corrupting environment plus the Doppler spatial covariance matrix $R_T(k,b)=R(k,b)+R_c(k,b)$. At 740, the process computes a Doppler steering vector for the at least one transmitter and at least one Doppler channel as a function of the Doppler channel estimates and the Doppler signal correlation function. For communication systems with regular cyclic prefixes or no cyclic prefixes, $$p_{u,v}(k,b) = \frac{1}{\sqrt{N}}\sum_{w=-V}^{V} e^{j2\pi wn_b/N_k}\sum_{l=0}^{L-1} h_{u,w}(l)R_z(w,v,l,0,k).$$

For communication systems with no cyclic prefixes, $$p_{u,v}(k,b) = \frac{1}{\sqrt{N}}\sum_{w=-V}^{V} e^{j2\pi wn_b/N_k}G_{u,w,v}(k)\alpha(w-v).$$

To complete the process (750), the combining weight at subcarrier k and DFT block b are computed for at least one transmitter and at least one Doppler channel as a function of the total Doppler spatial covariance and the Doppler steering vector $w_{u,v}(k,b)=(R_T(k,b))^{-1}p_{u,v}(k,b)$.

FIG. 8 numeral 800 is a flow chart representation of fixed-in-time combining weight calculations for communication systems with regular cyclic prefixes, in accordance with the present invention. The process is provided the time-domain Doppler channel estimates for each transmitter, and a spatial covariance matrix of a corrupting environment from the channel estimation device 208. A Doppler spatial covariance matrix is computed as a function of the time-domain Doppler channel estimates and the Doppler sinusoids (820):

$$R(k) = \frac{1}{N}\sum_{b=1}^{B}\sum_{u=1}^{U}\sum_{v=-V}^{V}\sum_{w=-V}^{V}$$

-continued $$e^{j2\pi(v-w)n_b/N_k}\sum_{f=0}^{K-1} Q_v((k-f)_n)Q_w^*((k-f)_N)G_{u,v}(f)G_{u,w}^*(f)$$

where $$Q_v(k) = \frac{1}{\sqrt{N}}\sum_{n=0}^{N-1} q_v(n)e^{-j2\pi kl/N},\ G_{u,v}(k) = \sum_{l=0}^{L-1} g_{u,v}(l)e^{-j2\pi kl/N},$$

$$g_{u,v}(l) = h_{u,v}(l)e^{-j2\pi vl/N_k},\text{ and } q_v(n) = e^{j2\pi vn/N_k}.$$

$h_{u,v}(l)$ are the time-domain Doppler channels for user u, and $q_v(n)$ are the Doppler sinusoids. Next (830) the method computes a total Doppler spatial covariance matrix as a sum of the spatial covariance matrix of the corrupting environment plus the Doppler spatial covariance matrix $(R_T(k)=R(k)+R_c(k))$. (840) A Doppler steering vector for the at least one transmitter is computed as a function of the Doppler channel estimates and the Doppler sinusoids $$\left(p_u(k) = \frac{1}{\sqrt{N}}\sum_{b=1}^{B}\sum_{v=-V}^{V} e^{j2\pi vn_b/N_k}Q_v(0)G_{u,v}(k)\right).$$

With the result, a combining weight is computed at subcarrier k for at least one transmitter and at least one Doppler channel as a function of the total Doppler spatial covariance and the Doppler steering vector for the at least on transmitter. The equation for 850 is $w_u(k)=(R_T(k))^{-1}p_u(k)$.

FIG. 9, numeral 900 is a flow chart representation of fixed in time combining weight calculations for communication systems with regular cyclic or no cyclic prefixes, in accordance with the present invention. The process is provided the time-domain Doppler channel estimates (910) for each transmitter, and a spatial covariance matrix of a corrupting environment from the channel estimation device (208). A Doppler spatial covariance matrix is computed as a function of the time-domain Doppler channel estimates and the Doppler signal correlation function (920). For communication systems with regular or no cyclic prefixes, the equation $$R(k) = $$

$$\frac{1}{N}\frac{1}{N}\sum_{b=1}^{B}\sum_{u=1}^{U}\sum_{v=-V}^{V}\sum_{w=-V}^{V} e^{j2\pi(v-w)n_b/N_k}\sum_{l=0}^{L-1}\sum_{t=0}^{L-1} h_{u,v}(l)h_{u,w}^H(t)R_z(v,w,l,t,k),$$

is used where $h_{u,v}(l)$ are the time-domain Doppler channels for user u and $R_z(v,w,l,t,k)$ is the Doppler signal correlation function which is given as (for communication systems with regular cyclic prefixes), $$R_z(v,w,l,t,k) = e^{-j2\pi k(l-t)/N}\begin{bmatrix}\sum_{n=\max(0,l-t)}^{\min(N-1,N-1+l-t)} e^{j2\pi(v-w)(n-l)/N_k} + \\ \sum_{n=0}^{l-t-1} e^{j2\pi(v-w)(n-l)/N_k}e^{-j2\pi wN/N_k} + \\ \sum_{n=N+l-1}^{N-1} e^{j2\pi(v-w)(n-l)/N_k}e^{j2\pi wN/N_k}\end{bmatrix}.$$

$R_z(v,w,l,t,k)$ for communication systems with no cyclic prefixes equals $R_z(v,w,l,t,k)=e^{-j2\pi k(l-t)/N}e^{-j2\pi(v-w)l/N_k}\alpha(v-w)$, where $$\alpha(v) = \sum_{n=0}^{N-1} e^{j2\pi v n/N_k}.$$

For communication systems with no cyclic prefixes, the Doppler spatial covariance matrix can be expressed as:

$$R(k) = \frac{1}{N}\sum_{b=1}^{B}\sum_{u=1}^{U}\sum_{v=-V}^{V}\sum_{w=-V}^{V} e^{j2\pi(v-w)n_b/N_k} \alpha(v-w)G_{u,v,w}(k)H_{u,w}^{H}(k),$$

where $$\alpha(v) = \sum_{n=0}^{N-1} e^{j2\pi v n/N_k}, \quad G_{u,v,w}(k) = \sum_{l=0}^{L-1} h_{u,v}(l)e^{-j2\pi(v-w)l/N_k} e^{-j2\pi kl/N},$$

$$\text{and } H_{u,v}(k) = \sum_{l=0}^{L-1} h_{u,v}(l)e^{-j2\pi kl/N}.$$

Next, 930, a total Doppler spatial covariance matrix is computed as a sum of the spatial covariance matrix of the corrupting environment plus the Doppler spatial covariance matrix $R_T(k)=R(k)+R_c(k)$). The process now computes a Doppler steering vector for the at least one transmitter and at least one Doppler channel as a function of the Doppler channel estimates and the Doppler signal correlation function (940). For communication systems with regular cyclic prefixes or no cyclic prefixes, $$p_{u,v}(k) = \frac{1}{\sqrt{N}}\sum_{b=1}^{B}\sum_{w=-V}^{V} e^{j2\pi wn_b/N_k}\sum_{l=0}^{L-1} h_{u,w}(l)R_z(w,v,l,0,k).$$

For communication systems with no cyclic prefixes, $$p_{u,v}(k) = \frac{1}{\sqrt{N}}\sum_{b=1}^{B}\sum_{w=-V}^{V} e^{j2\pi wn_b/N_k} G_{u,w,v}(k)\alpha(w-v).$$

With these equations completed, the process now computes a combining weight at subcarrier k for at least one transmitter and at least one Doppler channel as a function of the total Doppler spatial covariance and the Doppler steering vector for the at least one transmitter and at least one Doppler channel ($w_{u,v}(k)=(R_T(k))^{-1}p_{u,v}(k)$).

Once combining weights are found, the transmitted data can be found by weighting the received frequency-domain data with the combining weights. In equation form this is expressed as:

$$\hat{X}_{u,v}(k,b) = w_{u,v}^{H}(k,b)Y(k,b)$$

where $\hat{X}_{u,v}(k,b)$ is the estimated frequency-domain symbol of user u for Doppler channel v. For fixed in time weights, $w_{u,v}(k,b)$ would be replaced in the previous equation by $w_{u,v}(k)$. To obtain an estimate of the time-domain transmitted symbols, $\hat{X}_{u,v}(k,b)$ needs to be brought back to the time domain and be de-rotated by the conjugate of the $v^{th}$ Doppler sinusoid. In equation form, this process is expressed in the following two steps:

First, the time-domain symbol estimates for user u and Doppler channel v are $$\hat{x}_{u,v} = (n,b) = \frac{1}{\sqrt{N}}\sum_{k=0}^{N-1} \hat{X}_{u,v}(k,b)e^{j2\pi kn/N}$$

Then, the estimated time-domain symbols for user u are given as:

$$\hat{x}_u(n,b) = \hat{x}_{u,v}(n,b)e^{-j2\pi v(n+n_b)/N_k}$$

Figure 10:
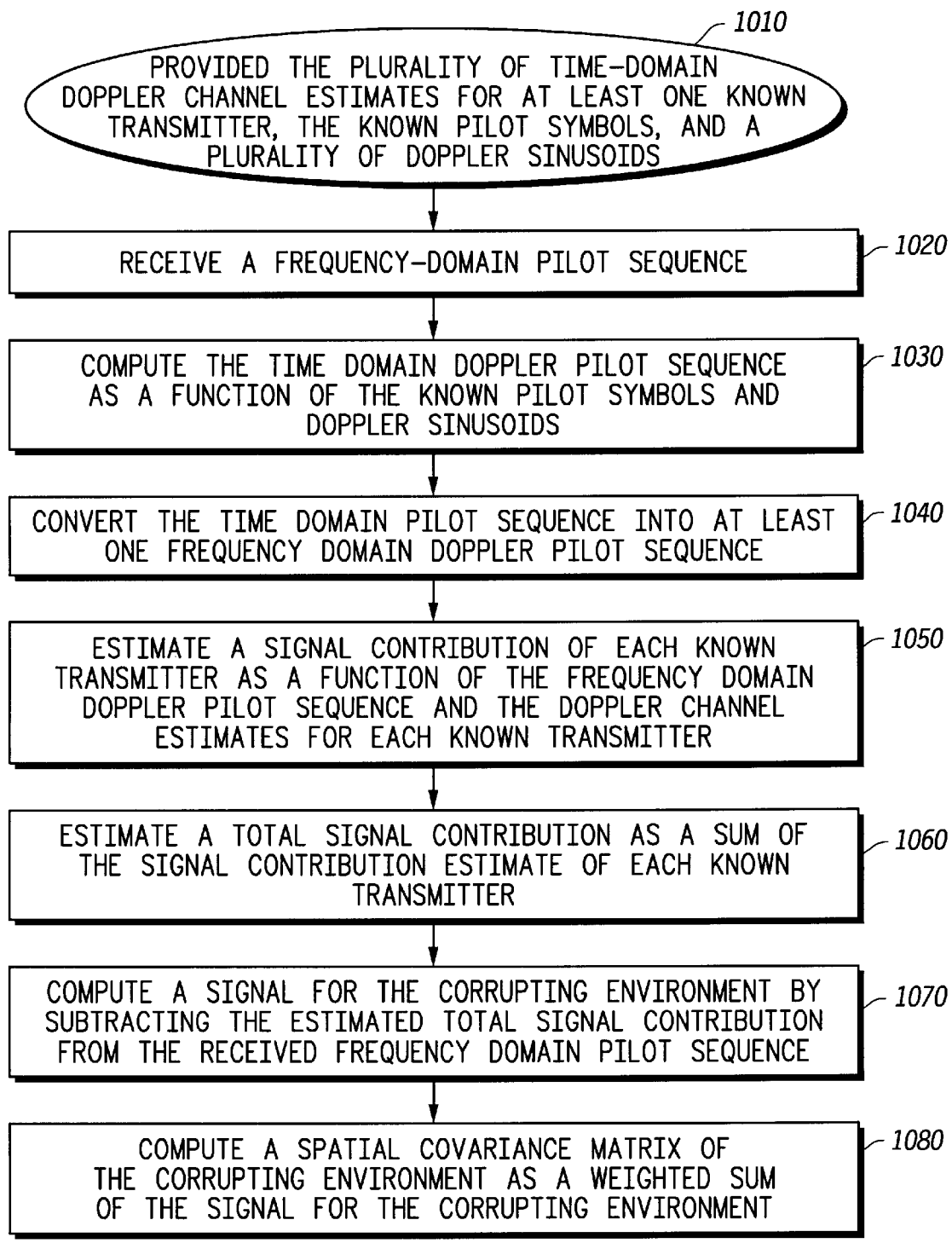
FIG. 10 is a flow chart representation of a preferred embodiment of the method performed by the device of FIG. 2 for computing a spatial covariance matrix of the corrupting environment in accordance with the present invention.

FIG. 10, numeral 1000, is a flow chart representation of the spatial covariance matrix estimation for the corrupting environment for communication systems with regular or no cyclic prefixes, in accordance with the present invention. The process is provided a plurality of time-domain Doppler channel estimates for at least one known transmitter from the channel estimation device (208). The process is also provided with a plurality of Doppler sinusoids and the known pilot symbols. Next, a frequency-domain pilot sequence is received (1020) where Y(k,b) is the variable representation of the frequency-domain pilot sequence. Next the time domain Doppler pilot sequence is computed as a function of the known pilot symbols and the Doppler sinusoids (1030). The process converts the time domain Doppler pilot sequence into at least one frequency domain Doppler pilot sequence (1040). At 1050, the process estimates a signal contribution of each known transmitter as a function of the frequency domain Doppler pilot sequence, multiplied by the Doppler channel estimates for each known transmitter. The estimated signal contribution for desired transmitter u is:

$$\hat{x}_u(k,b) = \frac{1}{\sqrt{N}}\sum_{u=1}^{U}\sum_{v=-V}^{V} e^{j2\pi vn_b/N_k}\sum_{l=0}^{L-1} h_{u,v}(l)Z_{u,v,l}(k,b),$$

where the frequency-domain Doppler pilot sequence is given as:

$$Z_{u,v,l}(k,b) = \sum_{n=0}^{N-1} z_{u,v}(n-l,b)e^{-j2\pi kn/N}.$$

For systems with regular cyclic prefixes, the time-domain Doppler pilot sequences are: $z_{u,v}(n,b)=x_u((n)_N,b)e^{j2\pi vn/Nis\,k}$. For systems with no cyclic prefixes, the time-domain Doppler pilot sequences are: $z_{u,v}(n,b)=x_u(n,b)e^{j2\pi vn/N_k}$, and $x_u(n,b)$ is known transmitter u's known pilot symbols. Next (1060), the process estimates a total signal contribution as a sum of the signal contribution estimate of each known transmitter $$\hat{x}_T(k,b) = \sum_{u=1}^{U}\hat{x}_u(k,b).$$

A signal for the corrupting environment is computed (1070) by subtracting the estimated total signal contribution from the received frequency domain pilot sequence ($x_c(k,b)=Y(k,b)-\hat{x}_T(k,b)$). In 1080, the procedure completes by computing a spatial covariance matrix of the corrupting environment as a weighted sum of the signal for corrupting environment $R_c(k,b)=\text{average}\{x_c(k,b)x_c^H(k,b)\}$, where average{ } means a weighted sum over a set of k and a set of b of the argument in the braces.

The present invention may be embodied in other specific forms without departing from its spirit or essential characteristics. The described embodiments are to be considered in all respects only as illustrative and not restrictive.

We claim:

1. A method of operating a communication system including at least one receiver comprising:
   providing to the receiver a plurality of time-domain Doppler channel estimates for at least one transmitter, a plurality of Doppler sinusoids, and a spatial covariance matrix of a corrupting environment;
   determining a Doppler spatial covariance matrix as a function of the time-domain Doppler channel estimates and the Doppler sinusoids;
   determining a total Doppler spatial covariance matrix as a function of the spatial covariance matrix of the corrupting environment and the Doppler spatial covariance matrix;
   determining a Doppler steering vector for at least one transmitter as a function of the Doppler channel estimates and the Doppler sinusoids; and
   determining a combining weight for the at least one transmitter as a function of the total Doppler spatial covariance matrix and the Doppler steering vector for at least one transmitter.

2. The method of claim 1 wherein the Doppler spatial covariance matrix R for at least one receiver is computed according to:

$$R(k,b) = \frac{1}{N} \sum_{u=1}^{U} \sum_{v=-V}^{V} \sum_{w=-V}^{V} e^{j2\pi(v-w)n_b/N_k}$$

$$\sum_{f=0}^{K-1} Q_v((k-f)_N) Q_w^*((k-f)_N) G_{u,v}(f) G_{u,w}^*(f)$$

wherein $$Q_v(k) = \frac{1}{\sqrt{N}} \sum_{n=0}^{N-1} q_v(n) e^{-j2\pi kl/N}, \; G_{u,v}(k) = \sum_{l=0}^{L-1} g_{u,v}(l) e^{-j2\pi kl/N},$$

$g_{u,v}(l) = h_{u,v}(l) e^{-j2\pi vl/N_k}$, and $q_v(n) = e^{j2\pi vn/N_k}$. $h_{u,v}(l)$ are the time-domain Doppler channels for user u, and $q_v(n)$ are the Doppler sinusoids.

3. The method of claim 1 wherein the Doppler spatial covariance matrix R for at least one receiver is computed according to:

$$R(k) = \frac{1}{N} \sum_{b=1}^{B} \sum_{u=1}^{U} \sum_{v=-V}^{V} \sum_{w=-V}^{V}$$

$$e^{j2\pi(v-w)n_b/N_k} \sum_{f=0}^{K-1} Q_v((k-f)_N) Q_w^*((k-f)_N) G_{u,v}(f) G_{u,w}^*(f)$$

wherein $$Q_v(k) = \frac{1}{\sqrt{N}} \sum_{n=0}^{N-1} q_v(n) e^{-j2\pi kl/N}, \; G_{u,v}(k) = \sum_{l=0}^{L-1} g_{u,v}(l) e^{-j2\pi kl/N},$$

$g_{u,v}(l) = h_{u,v}(l) e^{-j2\pi vl/N_k}$, and $q_v(n) = e^{j2\pi vn/N_k}$. $h_{u,v}(l)$ are the time-domain Doppler channels for user u, and $q_v(n)$ are the Doppler sinusoids.

4. The method of claim 1 wherein the total Doppler spatial covariance matrix $R_T$ for at least one receiver is computed according to: $R_T(k,b) = R(k,b) + R_c(k,b)$.

5. The method of claim 1 wherein the total Doppler spatial covariance matrix $R_T$ for at least one receiver is computed according to: $R_T(k) = R(k) + R_c(k)$.

6. The method of claim 1 wherein the Doppler steering vector p for at least one receiver is computed according to:

$$p_u(k,b) = \frac{1}{\sqrt{N}} \sum_{v=-V}^{V} e^{j2\pi vn_b/N_k} Q_v(0) G_{u,v}(k).$$

7. The method of claim 1 wherein the Doppler steering vector p for at least one receiver is computed according to:

$$p_u(k) = \frac{1}{\sqrt{N}} \sum_{b=1}^{B} \sum_{v=-V}^{V} e^{j2\pi vn_b/N_k} Q_v(0) G_{u,v}(k).$$

8. The method of claim 1 wherein the combining weight for at least one receiver is computed according to: $w_u(k,b) = (R_T(k,b))^{-1} p_u(k,b))$.

9. A method of operating a communication system including at least one receiver comprising:

providing to the receiver a plurality of time-domain Doppler channel estimates for at least one transmitter, a plurality of Doppler signal correlation function, and a spatial covariance matrix of a corrupting environment;
   determining a Doppler spatial covariance matrix as a function of the time-domain Doppler channel estimates and the Doppler signal correlation function;
   determining a total Doppler spatial covariance matrix as a sum of the spatial covariance matrix of the corrupting environment and the Doppler spatial covariance matrix;
   determining a Doppler steering vector for at least one transmitter and at least one Doppler channel as a function of the Doppler channel estimates and the Doppler signal correlation function; and
   determining a combining weight for the at least one transmitter and at least one Doppler channel as a function of the total Doppler spatial covariance matrix and the Doppler steering vector for at least one transmitter and at least one Doppler channel.

10. The method of claim 9 wherein the Doppler spatial covariance matrix R for communication systems with regular cyclic or no cyclic prefixes, and at least one receiver is computed according to:

$$R(k,b) = \frac{1}{N} \sum_{u=-V}^{U} \sum_{v=-V}^{V} \sum_{w=-V}^{V} e^{j2\pi(v-w)n_b/N_k} \sum_{l=0}^{L-1} \sum_{t=0}^{L-1} h_{u,v}(l) h_{u,w}^H(t) R_z(v,w,l,t,k),$$

wherein $h_{u,v}(l)$ are the time-domain Doppler channels for user u and $R_z(v,w,l,t,k)$ is the Doppler signal correlation function which is given for regular cyclic prefixes as $$R_z(v, w, l, t, k) = e^{-j2\pi k(l-t)/N} \begin{bmatrix} \sum_{n=\max(0,l-t)}^{\min(N-1,N-1+l-t)} e^{j2\pi(v-w)(n-l)/N_k} + \\ \sum_{n=0}^{l-t-1} e^{j2\pi(v-w)(n-l)/N_k} e^{-j2\pi wN/N_k} + \\ \sum_{n=N+l-t}^{N-1} e^{j2\pi(v-w)(n-l)/N_k} e^{j2\pi wN/N_k} \end{bmatrix}.$$

11. The method of claim 9 wherein the Doppler spatial covariance matrix R for communication systems with regular cyclic or no cyclic prefixes, and at least one receiver is computed according to:

$$R(k, b) = \frac{1}{N} \sum_{u=-V}^{U} \sum_{v=-V}^{V} \sum_{w=-V}^{V} e^{j2\pi(v-w)n_b/N_k} \sum_{l=0}^{L-1} \sum_{t=0}^{L-1} h_{u,v}(l) h_{u,w}^H(t) R_z(v, w, l, t, k),$$

wherein $h_{u,v}(l)$ are the time-domain Doppler channels for user u and $R_z(v,w,l,t,k)$ is the Doppler signal correlation function which is given for no cyclic prefixes as $R_z(v,w,l,t,k) = e^{-j2\pi k(l-t)/N} e^{-j2\pi(v-w)l/N_k} \alpha(v-w)$, wherein $$\alpha(v) = \sum_{n=0}^{N-1} e^{j2\pi vn/N_k}.$$

12. The method of claim 9 wherein the Doppler spatial covariance matrix R for communication systems with no cyclic prefixes, and at least one receiver is computed according to:

$$R(k, b) = \frac{1}{N} \sum_{u=1}^{U} \sum_{v=-V}^{V} \sum_{w=-V}^{V} e^{j2\pi(v-w)n_b/N_k} \alpha(v-w) G_{u,v,w}(k) H_{u,w}^H(k)$$

wherein $$\alpha(v) = \sum_{n=0}^{N-1} e^{j2\pi vn/N_k}, \quad G_{u,v,w}(k) = \sum_{l=0}^{L-1} h_{u,v}(l) e^{-j2\pi(v-w)l/N_k} e^{-j2\pi kl/N},$$

and $H_{u,v}(k) = \sum_{l=0}^{L-1} h_{u,v}(l) e^{-j2\pi kl/N}.$

13. The method of claim 9 wherein the Doppler spatial covariance matrix R for communication systems with regular cyclic or no cyclic prefixes, and at least one receiver is computed according to:

$$R(k) = \frac{1}{N} \sum_{b=1}^{B} \sum_{u=-V}^{U} \sum_{v=-V}^{V} \sum_{w=-V}^{V} e^{j2\pi(v-w)n_b/N_k} \sum_{l=0}^{L-1} \sum_{t=0}^{L-1} h_{u,v}(l) h_{u,w}^H(t) R_z(v, w, l, t, k),$$

wherein $h_{u,v}(l)$ are the time-domain Doppler channels for user u and $R_z(v,w,l,t,k)$ is the Doppler signal correlation function which is given for regular cyclic prefixes as $$R_z(v, w, l, t, k) = e^{-j2\pi k(l-t)/N} \begin{bmatrix} \sum_{n=\max(0,l-t)}^{\min(N-1,N-1+l-t)} e^{j2\pi(v-w)(n-l)/N_k} + \\ \sum_{n=0}^{l-t-1} e^{j2\pi(v-w)(n-l)/N_k} e^{-j2\pi wN/N_k} + \\ \sum_{n=N+l-t}^{N-1} e^{j2\pi(v-w)(n-l)/N_k} e^{j2\pi wN/N_k} \end{bmatrix}.$$

14. The method of claim 9 wherein the Doppler spatial covariance matrix R for communication systems with regular cyclic prefixes or no cyclic prefixes, and at least one receiver is computed according to:

$$R(k) = \frac{1}{N} \sum_{b=1}^{B} \sum_{u=-V}^{U} \sum_{v=-V}^{V} \sum_{w=-V}^{V} e^{j2\pi(v-w)n_b/N_k} \sum_{l=0}^{L-1} \sum_{t=0}^{L-1} h_{u,v}(l) h_{u,w}^H(t) R_z(v, w, l, t, k),$$

wherein $h_{u,v}(l)$ are the time-domain Doppler channels for user u and $R_z(v,w,l,t,k)$ is the Doppler signal correlation function which is given for no cyclic prefixes as $R_z(v,w,l,t,k) = e^{-j2\pi k(l-t)/N} e^{-j2\pi(v-w)l/N_k} \alpha(v-w)$, wherein $$\alpha(v) = \sum_{n=0}^{N-1} e^{j2\pi vn/N_k}.$$

15. The method of claim 9 wherein the Doppler spatial covariance matrix R for communication systems with no cyclic prefixes, and at least one receiver is computed according to:

$$R(k) = \frac{1}{N} \sum_{b=1}^{B} \sum_{u=1}^{U} \sum_{v=-V}^{V} \sum_{w=-V}^{V} e^{j2\pi(v-w)n_b/N_k} \alpha(v-w) G_{u,v,w}(k) H_{u,w}^H(k)$$

wherein $$\alpha(v) = \sum_{n=0}^{N-1} e^{j2\pi vn/N_k}, \quad G_{u,v,w}(k) = \sum_{l=0}^{L-1} h_{u,v}(l) e^{-j2\pi(v-w)l/N_k} e^{-j2\pi kl/N},$$

and $H_{u,v}(k) = \sum_{l=0}^{L-1} h_{u,v}(l) e^{-j2\pi kl/N}.$

16. The method of claim 9 wherein the total Doppler spatial covariance matrix $R_T$ for communication systems with no cyclic prefixes, and at least one receiver is computed according to $R_T(k,b) = R(k,b) + R_c(k,b)$.

17. The method of claim 9 wherein the total Doppler spatial covariance matrix $R_T$ for communication systems with no cyclic prefixes, and at least one receiver is computed according to $R_T(k) = R(k) + R_c(k)$.

18. The method of claim 9 wherein the Doppler steering vector for at least one transmitter and at least one Doppler channel, p for communication systems with regular cyclic prefixes or no cyclic prefixes and at least one receiver is computed according to:

$$p_{u,v}(k, b) = \frac{1}{\sqrt{N}} \sum_{w=-V}^{V} e^{j2\pi w n_b/N_k} \sum_{l=0}^{L-1} h_{u,w}(l) R_z(w, v, l, 0, k).$$

19. The method of claim 9 wherein the Doppler steering vector for at least one transmitter and at least one Doppler channel, p for communication systems with no cyclic prefixes and at least one receiver is computed according to:

$$p_{u,v}(k, b) = \frac{1}{\sqrt{N}} \sum_{w=-V}^{V} e^{j2\pi w n_b/N_k} G_{u,w,v}(k) \alpha(w-v).$$

20. The method of claim 9 wherein the Doppler steering vector for at least one transmitter and at least one Doppler channel, p for communication systems with regular cyclic prefixes or no cyclic prefixes and at least one receiver is computed according to:

$$p_{u,v}(k, b) = \frac{1}{\sqrt{N}} \sum_{b=1}^{B} \sum_{w=-V}^{V} e^{j2\pi w n_b/N_k} \sum_{l=0}^{L-1} h_{u,w}(l) R_z(w, v, l, 0, k).$$

21. The method of claim 9 wherein the Doppler steering vector for at least one transmitter and at least one Doppler channel, p for communication systems with no cyclic prefixes and at least one receiver is computed according to:

$$p_{u,v}(k) = \frac{1}{\sqrt{N}} \sum_{b=1}^{B} \sum_{w=-V}^{V} e^{j2\pi w n_b/N_k} G_{u,w,v}(k) \alpha(w-v).$$

22. The method of claim 9 wherein the combining weight for at least one receiver is computed according to: $w_{u,v}(k,b) = (R_T(k,b))^{-1} p_{u,v}(k,b)$.

23. A method of operating a communication system including at least one receiver comprising:
   providing to the receiver a plurality of time-domain Doppler channel estimates for at least one transmitter, a set of known pilot symbols, and a plurality of Doppler sinusoids;
   receiving a frequency-domain pilot sequence;
   determining the time domain Doppler pilot sequence as a function of the known pilot symbols and the Doppler sinusoids;
   converting the time domain Doppler pilot sequence into a frequency-domain Doppler pilot sequence;
   determining an estimate of the signal contribution of each known transmitter as a function of the frequency domain Doppler pilot sequence and the Doppler channel estimate for the each known transmitter;
   determining an estimate of the total signal contribution as a function of the estimates of the signal contribution of each known transmitter;
   determining a signal for the corrupting environment as a function of the estimate of the total signal contribution and the received frequency domain pilot sequence;
   determining a spatial covariance matrix of the corrupting environment as a function of the signal for the corrupting environment.

24. The method of claim 23 wherein the time domain Doppler pilot sequence for communication systems with no cyclic prefixes is computed according to:

$$z_{u,v}(n,b) = x_u(n,b) e^{j2\pi v n/N_k}.$$

where $x_u(n,b)$ is known transmitter u's known pilot symbols.

25. The method of claim 23 wherein the time domain Doppler pilot sequence for communication systems with regular cyclic prefixes is computed according to:

$$z_{u,v}(n,b) = x_u((n)_N, b) e^{j2\pi v n/N_k}.$$

where $x_u(n,b)$ is known transmitter u's known pilot symbols.

26. The method of claim 23 wherein the estimate of the signal contribution of each known transmitter is computed according to:

$$\hat{x}_u(k, b) = \frac{1}{\sqrt{N}} \sum_{u=1}^{U} \sum_{v=-V}^{V} e^{j2\pi v n_b/N_k} \sum_{l=0}^{L-1} h_{u,v}(l) Z_{u,v,l}(k, b),$$

where the frequency-domain Doppler pilot sequence is given as:

$$Z_{u,v,l}(k, b) = \sum_{n=0}^{N-1} z_{u,v}(n-l, b) e^{-j2\pi k n/N}.$$

27. The method of claim 23 wherein the estimate of the total signal contribution is computed according to:

$$\hat{x}_T(k, b) = \sum_{u=1}^{U} \hat{x}_u(k, b).$$

28. The method of claim 23 wherein the signal for the corrupting environment is computed according to:

$$x_c(k,b) = Y(k,b) - \hat{x}_T(k,b)$$

where Y(k,b) is the received frequency domain pilot sequence.

29. The method of claim 23 wherein the spatial covariance matrix of the corrupting environment is computed according to:

$$R_c(k,b) = \text{average}\{x_c(k,b) x_c^H(k,b)\}.$$

Where average { } means a weighted sum over a set of k and a set of b of the argument in the braces.

30. A computer readable medium storing a computer program comprising:
   computer readable program code for receiving a pilot sequence;
   computer readable program code for converting the received pilot sequence into at least one frequency domain pilot sequence;

computer readable program code for providing a plurality of Doppler channel estimates from the frequency domain pilot sequence; and computer readable program code for determining a plurality of combining weights from channel estimates.

31. The program of claim 30 further comprising:

computer readable program code for determining a Doppler spatial covariance matrix as a function of a Doppler channel estimate and a Doppler signal correlation function.

32. The program of claim 30 further comprising:

computer readable program code for determining a Doppler spatial covariance matrix as a function of a time-domain Doppler channel estimate and a Doppler sinusoid.

33. The program of claim 30 further comprising:

computer readable program code for determining combining weights as a function of a Doppler spatial covariance and a Doppler steering vector.

* * * * *